United States Patent
Frederick

(10) Patent No.: US 8,858,307 B2
(45) Date of Patent: Oct. 14, 2014

(54) FIELD DRESSING DEVICE

(71) Applicant: Brian Ray Frederick, Vining, MN (US)

(72) Inventor: Brian Ray Frederick, Vining, MN (US)

(73) Assignee: Brian Frederick, Vining, MN (US)

(*) Notice: Subject to any disclaimer, the term of this patent is extended or adjusted under 35 U.S.C. 154(b) by 0 days.

(21) Appl. No.: 14/152,719

(22) Filed: Jan. 10, 2014

(65) Prior Publication Data

US 2014/0199927 A1 Jul. 17, 2014

Related U.S. Application Data

(60) Provisional application No. 61/751,721, filed on Jan. 11, 2013.

(51) Int. Cl.
*A22C 21/00* (2006.01)
*A22B 5/06* (2006.01)

(52) U.S. Cl.
CPC .................................... *A22B 5/06* (2013.01)
USPC ...................................................... 452/194

(58) Field of Classification Search
USPC .................. 452/18–192, 197; 294/81.1, 81.2, 294/81.21, 81.3, 67.4, 74, 81.5, 81.56, 82.1, 294/81.54
See application file for complete search history.

(56) References Cited

U.S. PATENT DOCUMENTS

| | | | | |
|---|---|---|---|---|
| 1,148,393 A * | 7/1915 | McGrath | ........................ | 452/189 |
| 3,188,130 A * | 6/1965 | Pietrowicz | ........................ | 294/74 |
| 4,763,942 A * | 8/1988 | Lyon | ........................ | 452/192 |
| 4,909,555 A * | 3/1990 | Blasi | ........................ | 452/189 |
| 5,145,224 A * | 9/1992 | Welk | ........................ | 294/2 |
| 5,836,812 A * | 11/1998 | Brackett | ........................ | 452/187 |
| 6,186,882 B1 * | 2/2001 | Adams et al. | ........................ | 452/189 |
| 6,712,687 B1 * | 3/2004 | Douglas | ........................ | 452/189 |
| 7,125,331 B1 * | 10/2006 | Sayers | ........................ | 452/189 |
| 2010/0126056 A1 | 5/2010 | Nice | | |

* cited by examiner

*Primary Examiner* — Richard Price, Jr.

(57) ABSTRACT

A game stabilizing device that facilitates field dressing of big game is provided. The game stabilizing device includes a base with arms extending laterally from the base. Extending from the arms are elastic cords with connectors. The present invention may further include legs straps that are placed around the legs of the game. The base of the present invention is placed underneath the back of the game and the connectors are attached to the leg straps. Therefore, the game is stabilizing preventing swaying and the legs of the game are spread out so that a hunter may easily field dress the animal.

10 Claims, 3 Drawing Sheets

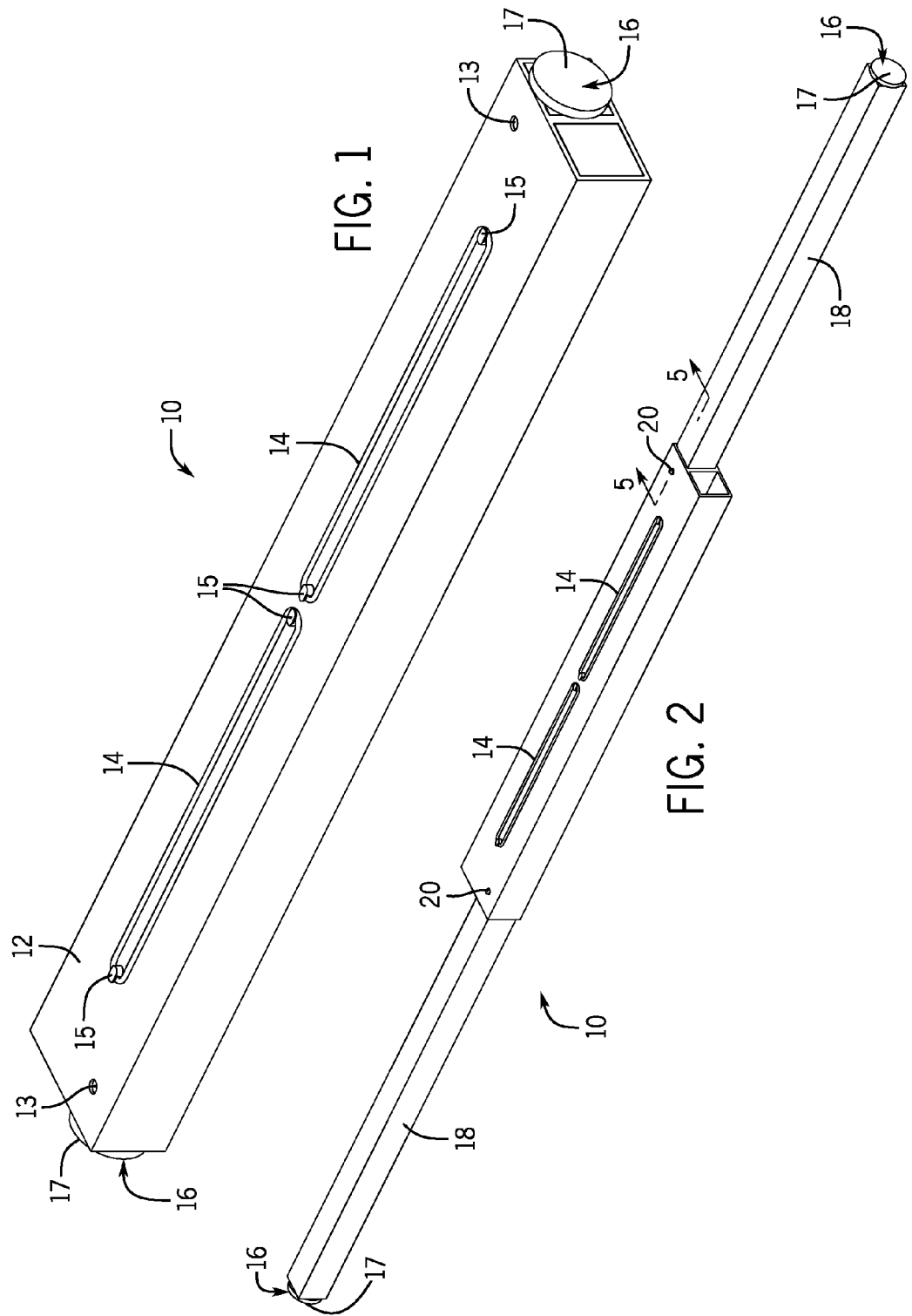

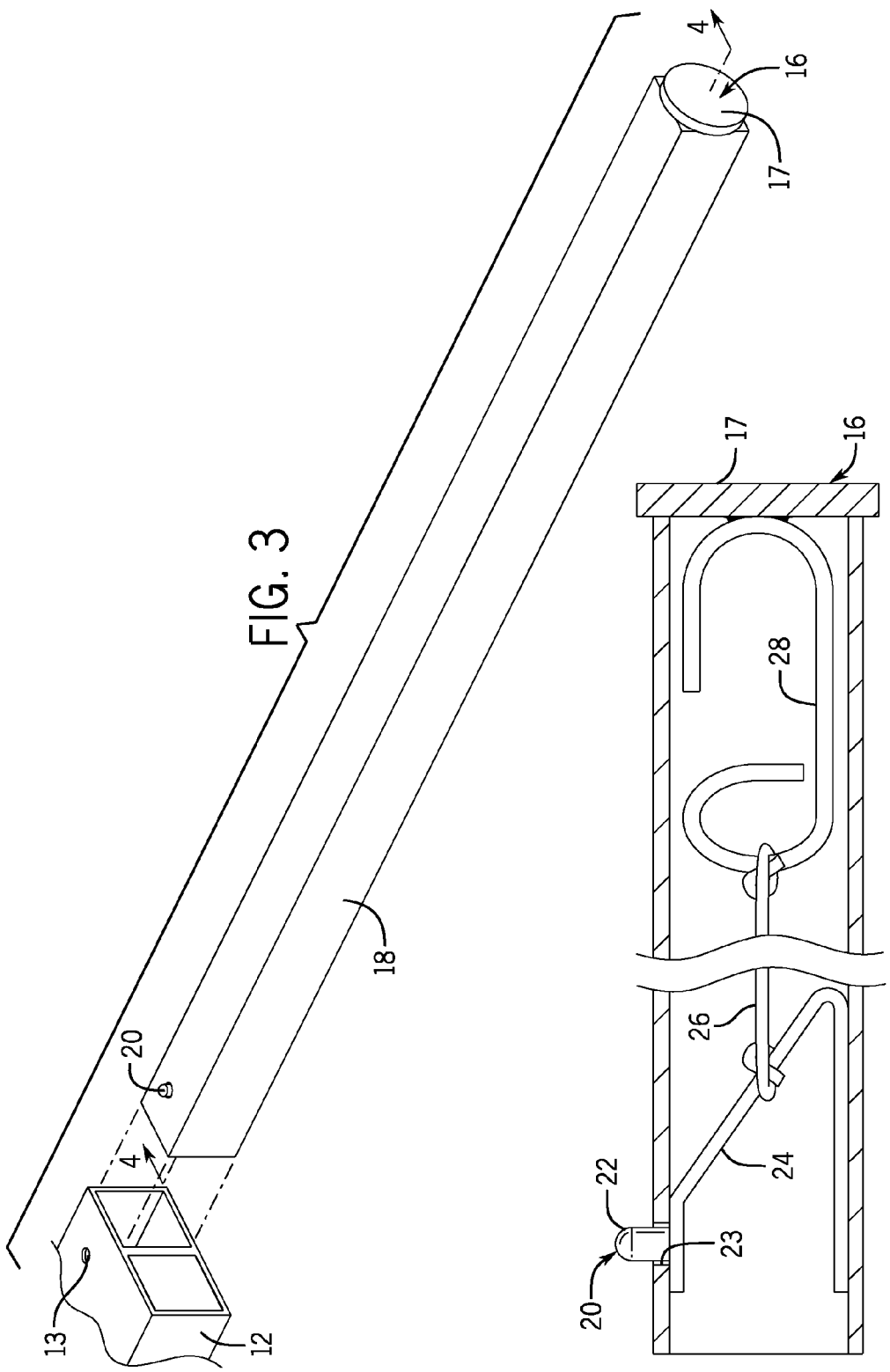

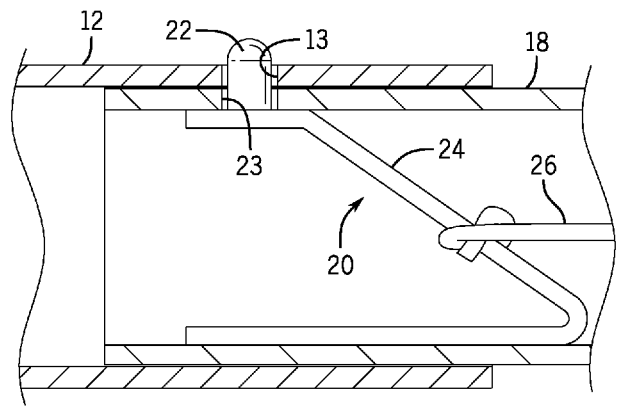
FIG. 5
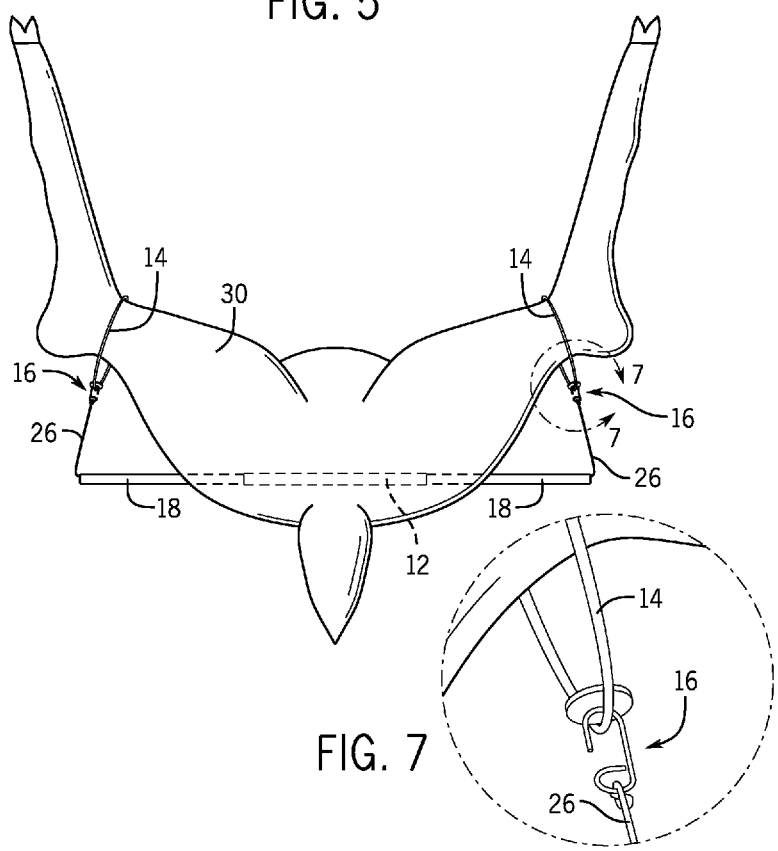
FIG. 6
FIG. 7

FIELD DRESSING DEVICE

CROSS-REFERENCE TO RELATED APPLICATION

This application claims the benefit of priority of U.S. provisional application No. 61/751,721, filed Jan. 11, 2013 the contents of which are herein incorporated by reference.

BACKGROUND OF THE INVENTION

The present invention relates to a field dressing device and, more particularly, to a field dressing device that stabilizes the game.

When one is field dressing a large game animal such as a deer, the carcass tends to fall to one side or the other and the legs tend to loosely flop, making the job difficult and sometimes dangerous considering the person doing the field dressing is generally utilizing a sharp knife or similar tool. It often requires the assistance of a second person to secure the animal for the person performing the necessary act of field dressing their game.

Current portable devices for securing game consist of multiple separate parts and require the use of stakes driven into the ground in order to truly secure the animal. These systems prove useless on frozen or rocky terrain which one may encounter in northern or mountainous parts of the world in late hunting seasons. If other methods are utilized without stakes, that method allows for tipping and rolling of the carcass throughout the field dressing process.

As can be seen, there is a need for a device that facilitates field dressing in difficult terrain.

SUMMARY OF THE INVENTION

In one aspect of the present invention, a game stabilizing device comprises: a base with a first side and a second side; at least a first arm and a second arm extending laterally from the first side and the second side of the base; at least a first elastic cord and a second elastic cord extending from the first arm and the second arm, wherein the first elastic cord and the second elastic cord comprise a connector; and at least a first leg strap and a second leg strap configured to rest around at least two of the game's legs, wherein the connectors are attachable to the first leg strap and the second leg strap.

In another aspect of the present invention, a method of stabilizing a game for dressing comprises: providing a game stabilizing device comprising a body having a first arm and a second arm extending laterally from the body, wherein the first arm comprises a first elastic cord having and the second arm comprises a second elastic cord; placing a first leg strap around a hind leg of the game, and placing a second leg strap around the other hind leg of the game; placing the game stabilizing device underneath the back of the game near the hind legs; and connecting the first elastic cord to the first leg strap and the second elastic cord to the second leg strap, thereby pulling the hind legs downward towards the base.

These and other features, aspects and advantages of the present invention will become better understood with reference to the following drawings, description and claims.

BRIEF DESCRIPTION OF THE DRAWINGS

FIG. 1 is a front perspective view of the present invention;
FIG. 2 is an exploded perspective view of the present invention;
FIG. 3 is a detail exploded perspective view of the present invention;
FIG. 4 is a cross-sectional view taken on line 4-4 of FIG. 3;
FIG. 5 is a cross-sectional view taken on line 5-5 of FIG. 2;
FIG. 6 is a front view of the present invention in use; and
FIG. 7 is a detail front view indicated by line 7-7 of FIG. 6.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a game stabilizing device that facilitates field dressing of big game. The game stabilizing device includes a base with arms extending laterally from the base. Extending from the arms are elastic cords with connectors. The present invention may further include legs straps that are placed around the legs of the game. The base of the present invention is placed underneath the back of the game and the connectors are attached to the leg straps. Therefore, the game is stabilized preventing swaying and the legs of the game are spread out so that a hunter may easily field dress the animal.

The present invention includes a device that assists in the field dressing of big game animals. The present invention may eliminate the need for a second party and is designed to hold the animal securely on its back, eliminating any flopping, rolling or tipping of the carcass toward or away from the person field dressing the animal. The present invention is a portable device which uses the animal's own body in conjunction with a rigid base to provide stability and anchors for leg retainers to secure the animal on its back as well as eliminate any tipping or rolling of the animal thereby eliminating the need for any stakes which are necessary with other systems to truly secure the animal. The size of the unit, the materials used and the finish colors/patterns could all vary.

Referring to FIGS. 1 through 7, the present invention includes a game stabilizing device 10. The game stabilizing device 10 may include a base 12 having a first side and a second side. At least a first arm 18 and a second arm 18 may extend laterally from the first side and the second side of the base 12 respectively. At least a first elastic cord 26 and a second elastic cord 26 may extend from the first arm 18 and the second arm 18. The elastic cords 26 may have an attached connector. At least a first leg strap 14 and a second leg strap 14 may fit around the hind legs of a game 30. The base 12 may be placed underneath the back of the game 30 and the connectors may connect the elastic cords 26 to the leg straps 14.

In certain embodiments, the present invention may include a retracted position and an extended position, thereby making the present invention more portable. For example, the first arm 18 and the second arm 18 may retract and extend from the base 12. The retracted position may include the first arm 18 and the second arm 18 substantially within the base 12 and the extended position may include the first arm 18 and the second arm 18 extending laterally from the base 12. In certain embodiments, a snap button lock 20 may be within the first arm 12 and the second arm 12. The snap button lock 20 may include a spring clip 24 and a button 22. The button 22 may extend through a hole 23 in the arms 18. The first side and the second side of the base 12 may include a spring clip hole 13. Therefore, the first arm 12 and the second arm 12 may extend from a housing within the base 12 and the buttons 22 may snap into the spring clip hole 13, retaining the first arm 12 and the second arm 12 in the extended position.

The connectors of the present invention may include any connector that connects the first and second elastic cord 26 to the first and second leg straps 14. In certain embodiments, the connectors may permanently attach the first and second elastic cord 26 with the first and second leg straps 14. In other embodiments, the connectors may releasably attach the first and second elastic cords 26 to the first and second leg straps 14. For example, the connectors may include hooks 28, clips, ties, snaps, and the like. As illustrated in the Figures, the hooks 28 may hook onto the first and second leg straps 14. When the connectors releasably attach to the leg straps 14, the surface of the base 12 may include retainer hooks 15 so that the leg straps 14 may be secured to the body 12, and the game stabilizing device 10 may be transported as one piece.

In certain embodiments, the first and second elastic cords 26 may be retained within the first and second arms 18, making the present invention more portable. In such embodiments, the first and second arms 18 may be substantially hollow forming an opening at the end, so that the first and second elastic cords 26 may be retained within and extend from the first and second arms 18. In certain embodiments, the first and second elastic cords 26 may be attached to the spring clip 24 that is within the first and second arm 18. In certain embodiments, the connectors may include stops 16 with larger dimensions than the opening of the first and second arms 18 so that the connectors may be easily accessed by a user. For example, a cap 17 may be attached to the end of the hook 28. The cap 17 may be larger than the opening and may rest against the opening in a retracted position.

A user may remove the leg straps 14 from the base 12 and slide one over each of the animal's hind legs up to the knee. The user may slide the arms 18 out of the base 12 into locking position utilizing the snap button locks 20. A user may slide the extended device 10 under the animal's back, perpendicularly centered. While putting downward pressure on one of the animal's legs, the user may draw the strap hook 16 out of one of the arms 18 and up to the leg strap 14, hooking the leg strap 14. The user may repeat for the other leg. The animal is now solidly secured. Upon completion of dressing the animal 10, the user may unhook the legs, slide the unit from under the carcass, depress the spring loaded tubing buttons 22, and push arms 18 back into the base 12. The user may remove the leg straps 14 from the animal 30 and reattach them to the base.

A method of stabilizing the game for dressing may include the following: providing a game stabilizing device comprising a body having a first arm and a second arm extending laterally from the body, wherein the first arm comprises a first elastic cord having and the second arm comprises a second elastic cord; adjusting the length of the first arm and the second arm; placing a first leg strap around a hind leg of the game, and placing a second leg strap around the other hind leg of the game; placing the game stabilizing device underneath the back of the game near the hind legs; and connecting the first elastic cord to the first leg strap and the second elastic cord to the second leg strap, thereby pulling the hind legs downward towards the base.

It should be understood, of course, that the foregoing relates to exemplary embodiments of the invention and that modifications may be made without departing from the spirit and scope of the invention as set forth in the following claims.

What is claimed is:

1. A game stabilizing device comprising:
   a base with a first side and a second side;
   at least a first arm and a second arm extending laterally from the first side and the second side of the base;
   at least a first elastic cord and a second elastic cord extending from the first arm and the second arm, wherein the first elastic cord and the second elastic cord comprise a connector; and
   at least a first leg strap and a second leg strap configured to rest around at least two of the game's legs, wherein the connectors are attachable to the first leg strap and the second leg strap.

2. The game stabilizing device of claim 1, wherein the first arm and the second arm comprise a retracted position and an extended position, wherein the retracted position comprises the first arm and the second arm substantially within the base and the extended position comprises the first arm and the second arm extending laterally from the base.

3. The game stabilizing device of claim 2, wherein the first arm and the second arm comprise a spring clip comprising a button and the first side and the second side of the base comprise a spring clip hole, wherein the button fits within the spring clip hole retaining the first arm and the second arm in the extended position.

4. The game stabilizing device of claim 1, wherein the first arm and the second arm are substantially hollow, forming an opening at the end, and wherein the first elastic cord and the second elastic cord are secured within the first arm and the second arm.

5. The game stabilizing device of claim 4, wherein the first elastic cord and the second elastic cord are attached to the spring clip of the first arm and the second arm.

6. The game stabilizing device of claim 4, wherein the connectors comprise hooks.

7. The game stabilizing device of claim 5, further comprising caps attached to the hooks, wherein the caps comprise dimensions greater than the openings at the end of the first arm and the second arm.

8. The game stabilizing device of claim 1, further comprising a plurality of retainer hooks attached to a surface of the base, wherein the plurality of retainer hooks are configured to secure at least the first leg strap and the second leg strap.

9. A method of stabilizing a game for dressing comprising:
   providing a game stabilizing device comprising a body having a first arm and a second arm extending laterally from the body, wherein the first arm comprises a first elastic cord having and the second arm comprises a second elastic cord;
   placing a first leg strap around a hind leg of the game, and placing a second leg strap around the other hind leg of the game;
   placing the game stabilizing device underneath the back of the game near the hind legs; and
   connecting the first elastic cord to the first leg strap and the second elastic cord to the second leg strap, thereby pulling the hind legs downward towards the base.

10. The method of claim 9, further comprising the step of adjusting the length of the first arm and the second arm.

* * * * *